United States Patent
Voss et al.

[11] Patent Number: 5,907,012
[45] Date of Patent: *May 25, 1999

[54] WATER-BASED POLYURETHANE-UREA LAMINATING ADHESIVES AND PRIMERS

[75] Inventors: Peter A. Voss, Plymouth; Thomas E. Rolando, Maple Grove, both of Minn.

[73] Assignee: H.B. Fuller Licensing & Financing, Inc., St.Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/629,194

[22] Filed: Apr. 8, 1996

[51] Int. Cl.⁶ .............................. C08J 3/00; C08K 3/20; C08L 75/00; C08F 8/30
[52] U.S. Cl. ..................... 524/591; 524/507; 524/539; 524/839; 524/840; 525/123; 525/455
[58] Field of Search ...................................... 524/539, 839, 524/840, 591, 507; 525/123, 455

[56] References Cited

U.S. PATENT DOCUMENTS

| | | | |
|---|---|---|---|
| 4,147,679 | 4/1979 | Scriven et al. | 260/29.2 TN |
| 4,851,459 | 7/1989 | Ramalingam | 523/414 |
| 4,883,694 | 11/1989 | Ramalingam | 428/35.2 |
| 5,250,610 | 10/1993 | Hänsel et al. | 524/591 |
| 5,494,960 | 2/1996 | Rolando et al. | |

FOREIGN PATENT DOCUMENTS

| | | |
|---|---|---|
| 0 259 679 A1 | 3/1988 | European Pat. Off. . |
| 0666275 A2 | 2/1995 | European Pat. Off. . |
| 1128568 | 10/1965 | Germany . |
| 42 22 530 A1 | 1/1994 | Germany . |
| WO 95/08583 | 3/1995 | WIPO . |

*Primary Examiner*—Patrick D. Niland
*Attorney, Agent, or Firm*—Nancy N. Quan

[57] ABSTRACT

Water-based polyurethane-urea polymers having reduced migratory contaminants. The polymers are useful laminating adhesives and primers for flexible packaging having indirect food contact.

22 Claims, No Drawings

WATER-BASED POLYURETHANE-UREA LAMINATING ADHESIVES AND PRIMERS

BACKGROUND OF THE INVENTION

This invention relates to water-based polymers. Specifically, it relates to water-based polyurethane-urea polymers having reduced migratory components. The cosolvent-free water-based anionic polyurethane-urea polymers are particularly suitable for flexible packaging having indirect food contact.

DESCRIPTION OF THE PRIOR ART

It is known that water-based polyurethane-urea polymers are useful adhesives and primers for flexible packaging. Generally, NCO-terminated polyurethane prepolymers are dispersed in water then chain terminated/extended with water soluble amines containing primary and/or secondary amines:

U.S. Pat. No. 5,494,960, H. B. Fuller Company, (St. Paul, Minn.) discloses a method for the preparation of water-based anionic polyurethane-urea polymers. The NCO-terminated polyurethane prepolymers, based on hindered diisocyanates, are dispersed in water than chain terminated/extended with a blend of monofunctional and difunctional amines.

EPA application #95101621.1, Air Products And Chemicals, Inc., (Allentown, Pa.) disclose laminating adhesives wherein isophorone diisocyanate based prepolymers are synthesized in ethylenically unsaturated monomers (reactive diluent). The NCO-terminated polyurethane prepolymer/monomer mixture is dispersed in water then chain terminated/extended with a blend of monofunctional and difunctional amines. Subsequent free radical emulsion polymerization generates polyurethane-urea/acrylic laminating adhesives.

A drawback to the polymers described in the prior art references relate to extractable amine chain terminators/extenders. Extractable amines, which are subject to food additive status as defined by the Food and Drug Administration (FDA), can adversely affect the development of laminating adhesives and primers having indirect food contact.

Other related documents which fail to disclose or suggest laminating adhesives, which are useful in applications having indirect food contact, include U.S. Pat. Nos. 4,851,459 and 4,883,694, Century Adhesives Corp. (Columbus, Ohio), U.K. Pat. No. 1,128,568, Farbenfabriken Bayer Aktiengeselischaft, (Germany) and U.S. Pat. No. 5,250,610, Bayer Aktiengesellschaft (Germany).

Therefore, there remains a need for water-based polyurethane-urea polymers which are substantially free of extractable amine components.

SUMMARY OF THE INVENTION

The present invention is directed to water-based anionic polyurethane-urea polymers which are substantially free of extractable amine components. Said polymers are the reaction product of:
1) at least one water dispersible NCO-terminated polyurethane prepolymer comprising;
   (a) at least one polymeric polyol component;
   (b) at least one dihydroxy carboxylic acid which is neutralized with a tertiary amine; and
   (c) at least one diisocyanate;
2) at least one water soluble monoamine chain terminator;
3) at least one water soluble polyamine chain extender; and
4) at least one water dispersible polyfunctional crosslinking agent.

The present invention further comprises a process for the preparation of water-based anionic polyurethane-urea laminating adhesives and primers comprising:
1) Formation of a water dispersible NCO-terminated polyurethane prepolymer comprising;
   (a) at least one polymeric polyol component;
   (b) at least one dihydroxy carboxylic acid which is neutralized with a tertiary amine; and
   (c) at least one diisocyanate;
2) dispersing the NCO-terminated polyurethane prepolymer in water;
3) chain terminating with at least one water soluble monoamine; then
4) chain extending with at least one water soluble polyamine; and
   reacting said polymer with at least one water dispersible polyfunctional crosslinking agent immediately before the laminating process.

Surprisingly, the inventive dispersions have reduced particle size and meet FDA requirements as stated in section 175.1395, making them particularly suitable laminating adhesives and primers having indirect food contact.

In order to meet performance requirements, such as adhesion, machinability, clarity, tunnel resistance, humidity resistance, heat resistance and cost, it may be desirable to formulate the polymers of the invention with compatible polymers or copolymers. Said formulations comprising:
1) at least one water-based anionic polyurethane-urea polymer of the invention;
2) at least one water dispersible non-polyurethane based polymer including acrylics, vinyl/acrylics, styrene/acrylics, vinyl acetates, vinyl acetate/ethylene copolymers, polychloroprenes, styrene emulsions, styrene-butadiene emulsions, polyurethane dispersions; and
3) at least one water dispersible polyfunctional crosslinking agent including isocyanates, aziridines, epoxies, carbodiimides and mixtures thereof.

The water-based anionic polyurethane-urea polymers and formulations have good adhesion characteristics on substrates including paper, polyethylene, polypropylene, polyester, nylon, ethylene vinyl acetate, cellophane, polyvinyl chloride, metalized films, aluminum foil and Surlyn®, a copolymer from E. I. Dupont, (Wilmington, Del.).

DETAILED DESCRIPTION OF THE INVENTION

Ideally, water-based polyurethane-urea laminating adhesives and primers should be free of leachable contaminants when used in laminates having indirect food contact. FDA regulations require organic amine extractables less than 0.50 $\mu g/in^2$ which is approximately 50 ppb.

The polymeric diols, used in the preparation of the NCO-terminated polyurethane prepolymer, have hydroxyl numbers in a range from about 20 to about 140, and preferably from about 55 to about 110. The polymeric polyols include polyester polyols, polyether polyols, polycarbonate polyols, polyurethane polyols, polyacetal polyols, polyacrylate polyols, polycaprolactone polyols, polyester-ether polyols and the anionic polymeric polyols described in U.S. Pat. No. 5,334,690, Hoechst Aktiengesellschaft, Fed.

(Germany). Preferred anionic polymeric polyols are generated by reacting cyclic anhydrides (i.e., Phthalic anhydride) with polymeric polyols.

Small amounts of alkylene diols can be used in the preparation of the water dispersible NCO-terminated polyurethane prepolymer. The alkylene diol component can have hydroxy numbers in a range from about 111 to about 1250, and preferably from about 950 to about 1250. The alkylene diol component can be present in a range from about 0.1% by weight to about 5.0% by weight, and preferably from about 1.0% by weight to about 4.0% by weight based on 100 parts total solids. Examples include diethylene glycol, tetraethylene glycol, 1,4-butanediol, 1,6-hexanediol, cyclohexane dimethanol, furan dimethanol, glycerol, bis-(dihydroxyethyl) lauramide, polyethylene ether glycols, poly-1,2-propylene ether glycols, polytetramethylene ether glycols, poly-1,2-dimethylethylene ether and mixtures thereof The preferred alkylene diols are 1,4-butanediol and 1,6-hexanediol.

The dihydroxy carboxylic acid used in the preparation of the water dispersible NCO-terminated polyurethane prepolymer are in such quantities that the acid values, as determined by ASTM D-1639-90, are in a range from about 10 to about 30, and preferably from about 15 to about 22. Examples include 2,2-dimethylolacetic acid, 2,2-dimethylolpropionic acid, 2,2-dimethylolbutyric acid and 2,2-dimethylolpentanoic acid. The preferred dihydroxy carboxylic acid is 2,2-dimethylolpropionic acid.

Neutralization of said dihydroxy carboxylic acid is accomplished with suitable amines including trimethylamine, triethylamine, tri-n-propyl amine, tri-n-butyl amine, n-methylpiperidine, n-ethylpiperidine, n-methylpyrrolidine, ethyldipropylamine, ammonia and mixtures thereof. The preferred amine is triethylamine. Conversion of said acid groups to ionic groups (salts) can be accomplished prior to the condensation reaction or immediately before the NCO-terminated polyurethane prepolymer is dispersed in water.

The diisocyanates used in the preparation of the water dispersible NCO-terminated polyurethane prepolymer can include linear aliphatic, cyclic aliphatic, aromatic and mixtures thereof. Examples include ethylene diisocyanate, propylene diisocyanate, hexemethylene diisocyanate, trimethylene diisocyanate, cyclopentylene diisocyanate, cyclohexylene diisocyanate, dicyclohexylmethane diisocyanate, phenylene diisocyanate, norborane diisocyanate, toloylene diisocyanate, 2,4'-and the 4-4'-isomers of diphenylmethane diisocyanate, isophorone diisocyanate, tetramethylene diisocyanate, polyethoxylated diisocyanates, polypropoxylated diisocyanates, naphthalene diisocyanate, and the diisocyanates described in U.S. Pat. No. 3,920,598, Bayer Aktiengesellschaft (Germany). The preferred diisocyanates are selected from the group consisting of tetramethylxylene diisocyanate, isophorone diisocyanates and mixtures thereof.

The NCO-terminated polyurethane prepolymer is prepared by reacting a stoichiometric excess of diisocyanate with the polyol components. The reactants are in such proportions that the resulting percent isocyanate is in a range from about 1.0% by weight to about 5.0% by weight, and preferably from about 2.0% by weight to about 4.0% by weight based on 100 parts total prepolymer solids. The prepolymer is processed at temperatures in a range from about 70° C. to about 110° C., and preferably from about 80° C. to about 95° C.

Once the NCO-terminated polyurethane prepolymer has been formed, it is dispersed in distilled/de-ionized water with mild agitation. The water temperature before dispersing is in a range from about 15° C. to about 30° C., and preferably from about 20° C. to about 25° C.

The water-based NCO-terminated polyurethane prepolymer is then chain terminated with water soluble monoamines; then chain extended with water soluble polyamines. When this sequential addition is used, polymers are produced which are substantially free of amine extractables. This is thus a preferred method. It is surmised incorporation of said amines is influenced by the amine/isocyanate collision frequency. The collision theory of reaction rates is described in "Organic Chemistry", T. W. Graham Solomons, second edition, pages 139–141. The sequential addition also generates dispersions having reduced particle size enhancing stability, coalescing properties and dry times. Additionally, a smaller particle size distribution is important in the development of laminates having improved optical clarity.

The water soluble chain terminator component can include aliphatic monoamines, aromatic monoamines and mixtures thereof. The preferred monoamine is monoethanolamine. The monoamine compounds can be added to the aqueous medium at an equivalence ratio of amine active hydrogen to isocyanate in a range from about 0.01:1.0 to about 0.8:1.0, and preferably from about 0.1:1.0 to about 0.5:1.0. The term "active hydrogen atoms" refers to hydrogens which display activity according to the Zerewitinoff test as described by Kohlerin J. Am. Chem. Soc., 49, 3181 (1927). The dispersion temperature during chain termination is in a range from about 20° C. to about 40° C., and preferably from about 20° C. to about 25° C.

The water soluble polyamine component can be selected from the group consisting of diamines, triamines and mixtures thereof. Examples include hydrazine, substituted hydrazines, ethylene diamine, propylene diamine, butylene diamine, hexamethylene diamine, cyclohexylene diamine, piperazine, 2-methyl piperazine, phenylene diamine, tolylene diamine, xylyldiamine, tris (2-aminoethyl) amine and diethylene triamine. The preferred water soluble polyamines are ethylenediamine and diethylenetriamine. The water soluble polyamine components can be added to the aqueous medium at an equivalence ratio of amine active hydrogen to isocyanate in a range from about 0.1:1.0 to about 0.89:1.0, and preferably from about 0.4:1.0 to about 0.8:1.0. The dispersion temperature during chain extension is in a range from about 20° C. to about 40° C., and preferably from about 35° C. to about 40° C.

The particle size (mean diameter) of the fully reacted water-based anionic polyurethane-urea polymers are in a range from about 30 nanometer (nm) to about 100 nm, and preferably from about 50 nm to about 70 nm.

The water-based anionic polyurethane-urea polymers have a solids content in a range from about 30% by weight to about 45% by weight, and preferably from about 35% by weight to about 40% by weight.

In order to meet performance requirements such as adhesion, machinability, clarity, tunnel resistance, humidity resistance, heat resistance and cost, it may be desirable to formulate the water-based polyurethane-urea polymers with non-polyurethane based polymer dispersions. The non-polyurethane based polymers can include acrylics, vinyl/acrylics, styrene/acrylics, vinyl acetates, vinyl acetate-ethylene copolymers, polychloroprenes, styrene emulsions, styrene-butadiene emulsions, polyurethane dispersions and mixtures thereof. The formulations generally have a weight ratio of polyurethane-urea polymer to non-polyurethane polymer in a range from about 90:10 to about 10:90, and preferably from about 75:25 to about 25:75. The water-based formulations have a total solids content in the range from about 60% by weight to about 35% by weight, and preferably from about 50% by weight to about 40% by weight.

Small quantities of water dispersible polyfunctional crosslinking agents can be added. Crosslinking agents can include isocyanates, aziridines, epoxies, carbodiimides and mixtures thereof. The preferred crosslinking agents are polyfunctional aziridines. The crosslinking agents are present in a range from about 1.0% by weight to about 10.0% by weight, and preferably from about 3.0% by weight to about 6.0% by weight, based on 100 parts total solids. It is surmised that when crosslinking agents are added to the adhesive composition, an interpenetrating or interconnected network having crosslinked matrixes is formed. The resulting networks enhance heat, moisture and solvent resistance properties.

The characteristics of the water-based polyurethane-urea laminating adhesives, primers and formulations can be modified by the addition of surfactants, defoaming agents, fungicides, bactericides and thickening agents.

The present invention is further illustrated by the following non-limiting examples.

The following test method was used:

An extraction study was performed on laminate film samples to determine the potential migration of organic amines into food simulating solvents under exaggerated conditions of use. The extraction was performed in triplicate using 95% ethanol (extracting solvent) at approximately 65° C. for 30 minutes, and then at 50° C. for 240 hours. A gas chromatography method, having a limit of detection (LOD) at 0.5 $\mu g/in^2$, was used to determine amine extractables.

EXAMPLES

Example 1 describes the preparation of an acid grafted polyol used in the preparation of a water-based polyurethane-urea polymer.

To a reaction flask was charged 1330 grams (5.78 hydroxyl equivalence) Voranol® 230-238 which is a polyether triol from Dow Chemical Company, (Midland, Mich.) and 278.18 grams (1.87 moles) phthalic anhydride. The contents were heated to 154° C., using a nitrogen atmosphere and mild agitation, for 1 hour or until an acid number of 34.0 +/− 1.0 was achieved.

Example 2 describes the preparation of water-based polyurethane-urea polymers wherein the amine chain terminators/extenders are blended together before addition.

To a reaction flask was charged 80.0 grams (0.183 hydroxyl equivalence) of the acid grafted polyol described in example 1, 64.6 grams (0.058 isocyanate equivalence) isophorone diisocyanate, 198.5 grams (0.194 hydroxyl equivalence) Rucoflex® S 1011-55 which is a diethylene glycol/adipic acid based polyol from Ruco Corporation, (Hicksville, N.Y.) and 9.1 (0.09 moles) triethylamine. The materials were heated to 80° C. for approximately 2 hours or until the percent isocyanate reached 2.4% by weight based on total prepolymer solids. The NCO-terminated polyurethane prepolymer was dispersed in 620.9 grams distilled/deionized water. To the reaction mixture was charged a mixture containing 2.4 grams (0.039 amine equivalence) monoethanolamine, 3.9 grams (0.13 amine equivalence) ethylenediamine and 20.0 grams distilled/de-ionized water. The resulting dispersion had a pH of 7.5 and a solids content of 35%.

Example 3 describes the laminating process and extraction testing on the polymer described in example 2.

The adhesive described in example 2 was crosslinked with a water dispersible polyfunctional aziridine, at 2.0% by weight based on total solids, and processed using a geometric C/L 400 coater laminator. Said adhesive was coated on polyester (PET), having a thickness of 0.48 mils, using a line speed of 300 ft/min then passed through a dual zone drying tunnel 74° C. The dried adhesive/PET film was mated, using a combining nip at 414 kPa at a temperature of 80° C., with a secondary film consisting of low density polyethylene (LDPE) having a thickness of 1.0 mils. The laminates were subjected to extraction testing using food simulating solvents at elevated temperatures for an extended period of time. The food simulating solvents were then analyzed for migratory components using trace analysis analytical techniques. The laminates had amine extractables greater than 2.60 $\mu g/in^2$.

Example 4 describes the sequential addition of amine chain terminators/extenders for the preparation of water-based polyurethane-urea laminating adhesives having reduced amine extractables.

The polymer composition and process are exactly as described in example 2 except the NCO-terminated polyurethane prepolymer dispersion charged with a mixture containing 1.2 grams (0.019 amine equivalence) monoethanolamine and 10.0 grams distilled/de-ionized water. The aqueous dispersion was stirred 4 minutes, then a second mixture containing 4.8 grams (0.16 amine equivalence) ethylenediamine in 10.0 grams distilled/de-ionized water was added. The dispersion had a solids content of 36.29%. PET and LDPE films were laminated and tested as similarly described in example 3.

The laminates had levels of amine extractables less than 0.5 $\mu g/in^2$.

This produces a polymer with reduced amounts of amine extractables.

Example 4 describes the preparation of a water-based polyurethane-urea polymer based on isophorone diisocyanate.

To a reaction flask was charged 891.02 grams (1.74 hydroxyl equivalence) Rucoflex® S 102-110 which is a polyester polyol from Ruco Corporation, (Hicksville, N.Y.) 68.67 grams (1.025 hydroxyl equivalence) dimethylolpropionic acid, 491.07 grams (4.42 isocyanate equivalence) isophorone diisocyanate and 49.24 grams (0.48 moles) triethylamine. The mixture was heated to 90° C. for approximately 4 hours or until the isocyanate content reached 4.5%. The resulting NCO-terminated polyurethane prepolymer was dispersed in 1,142.60 grams distilled/de-ionized water then charged with a solution containing 5.05 grams (0.082 amine equivalence) ethanolamine in 18.71 grams distilled/de-ionized water. After stirring 2 minutes, the dispersion was charged with a solution containing 10.29 grams (0.321 amine equivalence) diethylene triamine in 18.71 grams distilled/de-ionized water. After stirring 2 minutes, the dispersion was finally charged with a solution containing 7.49 grams (0.249 equivalence) ethylenediamine in 18.71 grams distilled/de-ionized water. The polymer properties are described below:

pH=7.8
Viscosity=55 mPa.s
Particle size (mean diameter)=67 nm

COMPARATIVE DATA

In example 5, the polymer described in example 4 was chain terminated/extended using a blend of said amines. The dispersion had a mean diameter particle size of 140 nm. Because the particle size distribution increased using a blend of amines, this shows the utility of the sequential addition described in the present invention.

What is claimed is:

1. A water-based polyurethane-urea laminating adhesive and primer composition comprising the reaction product of
    a) at least one water dispersible NCO-terminated polyurethane prepolymer comprising the reaction product of
       i) at least one polymeric polyol component,
       ii) at least one dihydroxy carboxylic acid which is neutralized with a tertiary amine;
       iii) at least one diisocyanate; with
    b) at least one water soluble monoamine chain terminator;
    c) at least one water soluble polyamine chain extender; and
    d) at least one water dispersible polyfunctional crosslinking agent;
wherein component (b) is added prior to component (c) such that said composition is substantially free of amine extractables after drying on a coated substrate.

2. The laminating adhesive and primer as described in claim 1 wherein the adhesive and primer compositions have amine extractables of less than 0.5 $\mu g/in^2$ after drying on a coated substrate as compared to amine extractables of more than 2.6 $\mu g/in^2$ coated under the same conditions when components (b) and (c) are simultaneously added.

3. The laminating adhesive and primer as described in claim 1, wherein said polymeric diol is selected from the group consisting of polyester polyols, polyesterether polyols and mixtures thereof.

4. The laminating adhesive and primer as described in claim 3, wherein said polyester polyol is based on 1,4-butanediol and adipic acid.

5. The laminating adhesive and primer as described in claim 3, wherein said polyesterether polyol is based on diethyleneglycol and adipic acid.

6. The laminating adhesive and primer as described in claim 1, wherein the polyol component comprises at least one acid functional polymeric polyol.

7. The laminating adhesive and primer as described in claim 6, wherein the acid functional polymeric polyol is based on phthalic anhydride and at least one polymeric polyol component.

8. The laminating adhesive and primer as described in claim 1, wherein said acid is dimethylolpropionic acid.

9. The laminating adhesive and primer as described in claim 1, wherein said acid is neutralized with triethylamine.

10. The laminating adhesive and primer as described in claim 1, wherein said diisocyanate is selected from the group consisting of linear aliphatic diisocyanates, cyclic aliphatic diisocyanates, aromatic diisocyanates and mixtures thereof.

11. The laminating adhesive and primer as described in claim 1, wherein said diisocyanate is isophorone diisocyanate.

12. The laminating adhesive and primer as described in claim 1, wherein said monoamine chain terminator is ethanolamine.

13. The laminating adhesive and primer as described in claim 1, wherein said monoamine is added to said prepolymer using an equivalence ratio of amine active hydrogen to isocyanate in a range from about 0.1:1.0 to about 0.5:1.0.

14. The laminating adhesive and primer as described in claim 1, wherein said polyamine chain extender is selected from the group consisting of diamines, triamines and mixtures thereof.

15. The laminating adhesive and primer as described in claim 1, wherein said polyamine is selected from the group consisting of ethylenediamine, diethylenetriamine and mixtures thereof.

16. The laminating adhesive and primer as described in claim 1, wherein said polyamine is added to said prepolymer using an equivalence ratio of amine active hydrogen to isocyanate in a range from about 0.4:1.0 to about 0.8:1.0.

17. The laminating adhesive and primer as described in claim 1, wherein said crosslinking agent is selected from the group consisting of aziridines, epoxies, carbodiimides, isocyanates and mixtures thereof.

18. The laminating adhesive and primer as described in claim 1, wherein said crosslinking agent is present in an amount from about 3.0% by weight to about 6.0% by weight, based on total solids.

19. The laminating adhesive and primer as described in claim 1, comprising at least one water dispersible non-polyurethane based polymer selected from the group consisting of polyacrylics, polyvinyl/polyacrylics, polystyrene/polyacrylics, polyvinyl acetates, polyvinyl acetate/polyethylene copolymers and mixtures thereof.

20. The laminating adhesive and primer as described in claim 19, wherein the weight ratio of water-based polyurethane-urea polymer to non-polyurethane polymer is in a range from about 75:25 to about 25:75.

21. The laminating adhesive and primer composition as described in claim 1 wherein component (d) is added just prior to application of the resulting composition to a substrate such that component (d) completely reacts with components (a), (b) and (c) in a dry coating.

22. A water-based polyurethane-urea laminating adhesive and primer composition prepared by a process comprising:
    a) formation of at least one water dispersible NCO-terminated polyurethane prepolymer comprising the reaction product of;
       i) at least one polymeric polyol component;
       ii) at least one dihydroxy carboxylic acid which is neutralized with a tertiary amine; and
       iii) at least one diisocyanate;
    b) dispersing the isocyanate terminated polyurethane prepolymer in water;
    c) chain terminating with at least one water soluble monoamine chain terminator;
    d) chain extending with at least one water soluble polyamine chain extender; and
    e) adding at least one water dispersible polyfunctional crosslinking agent immediately prior to the laminating process; such that the resulting composition is substantially free of amine extractables after drying on a coated substrate when component (c) is added prior to component (d).

* * * * *